April 18, 1961     R. NIELSEN     2,980,041
APPARATUS FOR PLANTING SEEDLINGS
Filed Jan. 30, 1957
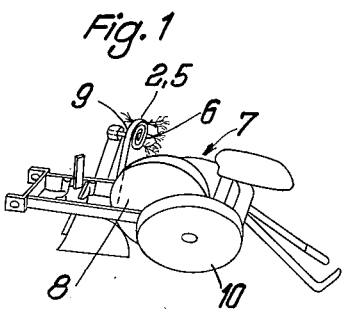
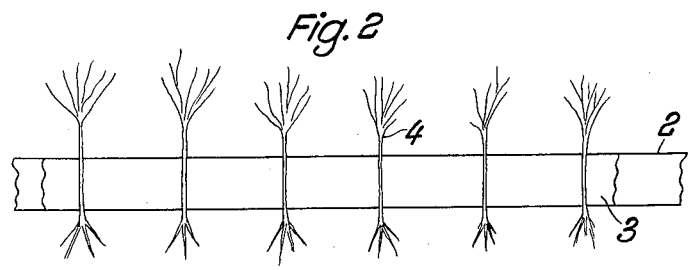
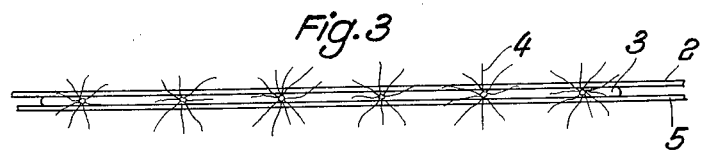
Inventor:
ROBERT NIELSEN
BY Karl F. Ross
AGENT United States Patent Office 2,980,041
Patented Apr. 18, 1961

2,980,041

APPARATUS FOR PLANTING SEEDLINGS

Robert Nielsen, Seilerstrasse 73, Soltau, Hannover, Germany

Filed Jan. 30, 1957, Ser. No. 637,171

Claims priority, application Germany Feb. 9, 1956

1 Claim. (Cl. 111—3)

The invention relates to an apparatus for planting seedlings of trees, shrubs and plants in a furrow in the soil; the substantial feature comprising that the seedlings are secured transversely on a ribbon in a desired plant spacing, the ribbon is wound with the seedlings on a reel and is fed continuously from this reel to a planting apparatus and remains with the planted seedlings in the soil. This has the advantage that the spacing of the seedlings may be positioned at constant intervals on the ribbon, which interval may be selected very close, e.g. 5 centimeters, and that the planting process, nevertheless, may be effected not at extremely low speed (such as 0.5 km./h.), but at a high rate of speed behind a towing tractor (such as 4 to 8 km./h.). Each plant is provided with adequate soil space and the soil is particularly well utilized. The planting ribbon may be prepared in case of unfavorable weather conditions below a roof. The finished wound reels provided with seedlings may be moistened and protected from drying by envelopes of synthetic material and may be held in storage for days.

The invention relates to the means and apparatus for planting the seedlings.

Figure 1 shows a planting implement with the planting ribbon in perspective view, Figure 2 is a view of a planting ribbon, Figure 3 is a top view thereof.

According to the invention, a ribbon 2 of fabric or preferably paper is provided with an adhesive layer 3, and seedlings of plants, shrubs or trees are adhered thereto in the spacings desired for the plants, e.g. 5 to 20 centimeters. A further ribbon 5 of the same material or a rubber strip is bonded then to the thus prepared ribbon 2. A vegetable adhesive or rubber may be used as adhesive to which nutritive material for the plants or insecticides or both of them are added so that the ribbon 2 by being spread with the adhesive 3 absorbs also the nutritive material and insecticide. Prior to applying the adhesive, the ribbons 2 and 5 may be soaked with nutritive materials and insecticides by dipping them into corresponding liquids and may then be dried. Then the ribbon 2 may be impregnated with nutritive agents and the cover ribbon 5 may be soaked with insecticides.

The ribbon is then wound on a reel 6 of a planting implement 7, and the reel is mounted above the resiliently compressed portions of the planting discs 8 on a fixed shaft 9, the ribbons 2, 5 are passed between the discs and inserted by the discs into the soil, whereupon the seedlings 4 are now standing upright in the soil and are compressed therein by the soil engaging wheels 10 compressing the soil beside the furrow.

I claim:

An apparatus for planting seedlings, comprising a forwardly wheelable frame; supply means on said frame for dispensing a tape having said seedlings projectingly secured to it in spaced-part relationship; furrow-opening blade means depending from a forward portion of said frame; a pair of forwardly and downwardly converging rotatable discs on said frame behind said blade means, said discs being resiliently urged against each other over a lower forward portion of their periphery for gripping said tape on its passage from said supply means to a furrow made by said blade means whereby the exposed ends of said seedlings project partly between said discs and partly beyond their peripheries; said supply means comprising a shaft positioned above said discs, said shaft extending substantially horizontally and parallel to the planes of said discs in close proximity to one of said planes, and a dispensing reel rotatable on said shaft in a plane substantially tangent to a forward edge portion of said discs and in a position such that said tape is gripped between the peripheries of said discs above their point of convergence whereby the tape remains in a plane transverse to a line interconnecting the centers of said discs upon being deposited in a furrow of said discs; and furrow-closing means attached to a rear portion of said frame behind said discs.

References Cited in the file of this patent

UNITED STATES PATENTS

| | | |
|---|---|---|
| 623,081 | Evans | Apr. 11, 1899 |
| 647,448 | Israel | Apr. 10, 1900 |
| 1,292,082 | Sanford | Jan. 21, 1919 |
| 1,750,054 | Rosso | Mar. 11, 1930 |
| 1,895,962 | Bateman et al. | Jan. 31, 1933 |
| 2,314,045 | Johnson | Mar. 16, 1943 |
| 2,565,548 | Cordes | Aug. 28, 1951 |

FOREIGN PATENTS

| | | |
|---|---|---|
| 74,703 | Austria | Sept. 25, 1918 |